Patented May 1, 1951

2,551,233

UNITED STATES PATENT OFFICE 2,551,233

METHOD OF TREATING A RESINOUS COATING TO WRINKLE IT AND ARTICLE RESULTING THEREFROM

Earl W. Balis and Lester B. Bronk, Schenectady, N. Y., assignors to General Electric Company, a corporation of New York No Drawing. Application January 26, 1949, Serial No. 73,016

8 Claims. (Cl. 117—41)

This invention relates to the treatment of surfaces coated with various resinous compositions and more particularly relates to a process for obtaining wrinkle finishes on surfaces coated with normally non-wrinkling synthetic resinous compositions, which process comprises (1) coating a surface with a synthetic resinous composition containing residual hydroxyl groups and selected from the class consisting of oil-modified alkyd resins and oil-modified phenol-aldehyde resins, (2) heating the coated surface to a temperature of at least 100° C., and (3) subjecting the heated surface to the action of an atmosphere comprising an organohalogenosilane.

One of the objects of this invention is to decrease the tackiness of surfaces freshly coated with synthetic resinous compositions of the class described above.

Another object of the invention is to improve the abrasion resistance of various surfaces coated with the aforementioned class of synthetic resinous compositions.

An important object of this invention is to obtain wrinkle finishes on surfaces with synthetic resinous compositions which, under the usual conditions for obtaining wrinkle finishes, are not capable of wrinkling.

Other objects of the invention will become more apparent from the following description thereof which is given by way of illustration rather than limitation.

We have discovered that all the foregoing objects, as well as other advantages, may be accomplished by heating, at a temperature of at least 100° C. and below its decomposition point, surfaces freshly coated with a synthetic resinous coating composition selected from the class consisting of oil-modified alkyd resins and oil-modified phenol-aldehyde resins, and thereafter subjecting the heated resinous surface while hot and in the uncured state to the vapors of an organohalogenosilane.

In accordance with our invention, the surface it is desired to treat is coated with a resinous composition containing residual or uncombined hydroxyl groups which are reactable with a hydrolyzable silicon-bonded halogen. In the case of oil-modified alkyd resins, the residual hydroxyl groups may inherently be present in the resin or as a result of using a slight excess of the polyhydric alcohol employed for making the oil-modified alkyd. Oil-modified phenol-aldehyde resinous compositions have at least two possibilities for containing uncombined or residual hydroxyl groups, for example, the hydroxyl group attached directly to the benzene nucleus of the particular phenol employed or the hydroxyl groups of alkylol radicals formed as a result of the reaction between the particular phenol and the aldehyde.

As pointed out previously, the resinous composition in the uncured state, for instance, in the A or B stage, is heated at a temperature of at least 100° C. but below its decomposition point, for instance, from 125° to 175° C. for a short period of time, for instance, of the order of from about one-half to three or four minutes. Thereafter, while the surface is still at around the stipulated temperature, the surface is subjected to the vapors of an organohalogenosilane.

The manner of treatment with the halogenosilane may be varied within wide limits without departing from the scope of the invention. One method comprises placing the heated, coated object in an air-tight chamber containing vapors of the organohalogenosilane or mixtures of halogenosilanes.

Among the organohalogenosilanes which may be employed in the practice of this invention may be mentioned, for example, alkyl halogenosilanes (e. g., methyl, ethyl, propyl, butyl, etc., halogenosilanes), the aryl halogenosilanes (e. g., phenyl halogenosilanes, etc.), aralkyl halogenosilanes (e. g., benzyl halogenosilanes, etc.), alkaryl halogenosilanes (e. g., tolyl halogenosilanes, etc.), compounds, such as, for example, methyldichlorosilane ($CH_3SiHCl_2$) and similar alkyl, aryl, etc. halogenosilanes, for example, chloro-, bromo-, fluoro-, etc., silanes.

Instead of the vapors of the individual organohalogenosilanes, we may use mixtures of various organohalogenosilanes either alone or with, for example, silicon tetrachloride, for instance, the constant boiling mixtures or azeotrope of trimethyltrichlorosilane and silicon tetrachloride; mixtures of methyltrichlorosilane and dimethyldichlorosilane, etc.; treatment of the coated surfaces with silicon tetrachloride alone was unsatisfactory and gave inferior results.

Further examples of organohalogenosilanes which may be employed in the practice of the invention may be found, for instance, in Patnode Patent 2,306,222, issued December 22, 1942, and Norton Patent 2,412,470, issued December 10, 1946, both of the aforementioned patents being assigned to the same assignee as the present invention. It is not essential that the organohalogenosilane or mixture of organohalogenosilanes employed normally be a gas; the only requirement is that it be convertible into a gas or vapor.

For optimum results, the chosen organohalogenosilane should have reasonable stability in the vapor or gaseous state. For many applications we prefer to employ methylchlorosilanes.

Any of the many resinous coating compositions (either with or without pigments, dyes, extenders, etc.) described above and containing the aforementioned reactive residual hydroxyl groups may be employed in the practice of the instant invention. Among the oil-modified alkyd resins which may be used are the many modified alkyds obtained by reacting a mixture containing one or more of the various polyhydric alcohols and polybasic acids which are well known to those skilled in the art. Examples of polyhydric alcohols which may be employed are, for instance, ethylene glycol, di-, tri-, tetraethylene glycol, dipropylene glycol, glycerol, sorbitol, pentaerythritol, etc. Examples of polybasic or polycarboxylic acids (or anhydride) which may be employed are, for instance, oxalic, malonic, succinic, adipic, phthalic acids (or anhydride), halogenated phthalic acids, for example, tetrachlorophthalic acid (or anhydride), 4-chlorophthalic acid; isophthalic acid, etc.

The modifying oils in the raw, heated, or blown state which may be employed in the preparation of the foregoing modifying alkyd resins are, for example, linseed oil, China-wood oil, castor oil, soya bean oil, oiticica oil, linseed oil acids, coconut oil acids, etc. The term "oil-modified" is intended to include both the various oils or oil acids normally employed in preparing what is commonly known as "oil-modified alkyd resin." The amount of the modifying ingredients, for instance, modifying oil or oil acids, may be varied within wide limits, for example, from 5 to 70 per cent, preferably from 10 to 60 per cent, by weight, of the total weight of the modifying ingredients, polyhydric alcohol, and the polybasic acid or acids (or anhydride, if used) present in the reaction mixture.

Equal molecular proportions of the polyhydric alcohol and the polycarboxylic acid or anhydride may be used in making the modified alkyd resin. Although such proportions will give a number of residual hydroxyl groups, we prefer to use at least a slight excess of the phthalic alcohol in order to increase the number of residual hydroxyl groups and in order to cause the esterification reaction to go more fully to completion. Techniques for making these oil-modified alkyd resins will be clearly apparent from prior work published in connection with alkyd resin preparation by the many workers in this art.

With regard to the oil-modified phenol-aldehyde resins which can be employed in the practice of the invention, it is desired to point out that the term "phenol" is employed generically in the specification and the claims appended hereto, and is intended to embrace hydroxybenzenes, such as, for instance, phenol itself, the various cresols, xylenols, mixtures of such hydroxybenzenes, etc. As is well-known to those skilled in the art of manufacturing oil-modified alkyd resins, it is desirable that the phenolic nucleus contain a branched chain alkyl radical of at least three carbon atoms to improve its compatibility or miscibility with the various modifying oils used in preparing the oil-modified phenolc resin. Examples of such alkyl-modified phenolic compounds are, for instance, para-tertiary butyl phenol, para-tertiary amyl phenol, etc.

In preparing the oil-modified phenol-aldehyde resins, it will, of course, be apparent that any of the many aldehydes may be employed for the purpose as, for instance, formaldehyde, acetaldehyde, butyraldehyde, furfural, etc.

As pointed out previously, the oil-modified alkyd and phenolic resins may have incorporated therein various pigments as, for instance, carbon black, ferric oxide, titanium dioxide, lithipone, zinc chromate, lead chromate, etc.; various dyes, fillers, extenders, etc. The amount of pigment, dye, etc., employed in the coating composition may be varied within wide limits depending on the application, the resin employed, the pigment or dye used, etc.

In order that those skilled in the art may better understand how the present invention may be practiced, the following example is given by way of illustration and not by way of limitation. The treating atmosphere employed below comprised a mixture of chlorosilanes which, by volume, contained 33 per cent methyldichlorosilane and 67 per cent of an azeotropic mixture (see the aforementioned Norton patent) of trimethylchlorosilane and silicon tetrachloride. This mixture will, for purposes of brevity, be referred to hereafter as "the chlorosilane mixture."

*Example*

A smooth, steel surface was sprayed with a 60 per cent solids xylol solution of a glycerolphthalate alkyd resin modified with linseed oil acids, and pigmented with lead chromate. The coated surface was heated to a temperature of about 150° C. for five minutes and while the surface temperature was above 100° C., it was immediately placed in a chamber containing vapors of the chlorosilane mixture for about three minutes. At the end of this time, when the coated object was removed, it was found that a pleasing wrinkle finish was present on the surface. Thereafter the treated, coated surface was baked for an additional thirty minutes at 150° C. without harming the wrinkle finish, but still completing the cure of the resinous surface. A control sample of the same resin-sprayed surface which was not subjected to the vapors of the chlorosilane mixture, when baked for thirty-five minutes at 150° C., remained smooth and unwrinkled.

It was also noted that whereas before subjecting the heated, coated surface to the vapors of the chlorosilane mixture, the surface was tacky, after such treatment all tackiness of the surface had disappeared as a result of the treatment with the chlorosilane mixture and the coated surface could be handled without any danger of marring. In addition, because of the prior treatment with the chlorosilane mixture, the final, cured, resinous surface was much tougher and harder than the baked surface from which treatment of the chlorosilane mixture was omitted.

Instead of employing a bake subsequent to treatment of the heated resinous surface with the organohalogenosilane, it is possible to omit this bake and permit the final cure to take place at essentially normal, i. e., room, temperatures with at least equivalent and in some respects better results than when the baking step is employed. This is made possible by the fact that the treatment with the vapors of the organohalogenosilane causes the surface to lose all its tackiness so as to yield a surface which has properties similar to those of surfaces which have been subjected to a further heat treatment.

It will, of course, be understood that the foregoing example is illustrative of the application of the method of the present invention and it is not intended to have the present invention limited to the particular materials employed in the example. Various modifications depending upon individual preferences and conditions may be employed without departing from the spirit of the disclosures and the scope of the appended claims.

Our invention has many applications, especially in the field of decorative surfaces. Thus, various housings may be obtained having attractive wrinkled surfaces which, in addition to having a pleasing decorative effect, are also tough and abrasion resistant. By means of our invention it is possible to obtain all types of wrinkled finishes without requiring complicated controls of conditions and expensive or special materials and procedures for manufacturing the coating compositions ordinarily used in producing wrinkled finishes.

What we claim as new and desire to secure by Letters Patent of the United States is:

1. The process which comprises (1) coating a surface with a normally non-wrinkling resinous composition comprising an oil-modified alkyd resin containing residual hydroxyl groups, (2) heating the resin-coated surface to a temperature of from 100° C. to below the decomposition point of the resin for at least ½ minute so as to bring the coating temperature above 100° C. but insufficient to effect complete curing of the resin, (3) contacting the heated resin-coated surface while still in the tacky state and while still at a temperature of at least 100° C., with an organohalogenosilane in the vapor state until the coating is substantially non-tacky and a wrinkle finish is obtained, and (4) effecting curing of the treated surface.

2. The process which comprises (1) coating a surface with a normally non-wrinkling resinous composition comprising an oil-modified alkyd resin containing residual hydroxyl groups, (2) heating the resin-coated surface to a temperature of from 100° C. to below the decomposition point of the resin for at least ½ minute so as to bring the coating temperature above 100° C. but insufficient to effect complete curing of the resin, (3) contacting the heated resin-coated surface while still in the tacky state and while still at a temperature of at least 100° C., with a hydrocarbon-substituted halogenosilane in the vapor state until the coating is substantially non-tacky and a wrinkle finish is obtained, and (4) effecting curing of the treated surface.

3. The process which comprises (1) coating a surface with a normally non-wrinkling oil-modified glyceryl-phthalate alkyd resin containing residual hydroxyl groups, (2) heating the resin-coated surface to a temperature of from 100° C. to below the decomposition point of the alkyd resin for at least ½ minute so as to bring the coating temperature above 100° C. but insufficient to effect complete curing of the resin, (3) contacting the heated resin-coated surface while still in the tacky state and while still at a temperature of at least 100° C., with a methylchlorosilane in the vapor state until the coating is substantially non-tacky and a wrinkle finish is obtained, and (4) effecting curing of the treated surface.

4. The process which comprises (1) coating a surface with a normally non-wrinkling linseed oil acid-modified glyceryl-phthalate alkyd resin containing residual hydroxyl groups, (2) heating the resin-coated surface to a temperature of from 100° C. to below the decomposition point of the resin for at least ½ minute so as to bring the coating temperature above 100° C. but insufficient to effect complete curing of the alkyd resin, (3) contacting the heated resin-coated surface while still in the tacky state and while still at a temperature of at least 100° C., with a methylchlorosilane in the vapor state until the coating is substantially non-tacky and a wrinkle finish is obtained, and (4) effecting curing of the treated surface.

5. The process which comprises (1) coating a surface with a normally non-wrinkling resinous composition comprising an oil-modified glyceryl-phthalate resin containing residual hydroxyl groups, (2) heating the resin-coated surface to a temperature of from 100° C. to below the decomposition point of the resin for at least ½ minute so as to bring the coating temperature above 100° C. but insufficient to effect complete curing of the alkyd resin, (3) contacting the heated resin-coated surface while still in the tacky state and while still at a temperature of at least 100° C., with an azeotropic mixture of trimethylchlorosilane and silicon tetrachloride in the vapor state until the coating is substantially non-tacky and a wrinkle finish is obtained, and (4) effecting curing of the treated surface.

6. An article of manufacture having a wrinkle finish surface obtained in accordance with the process described in claim 1.

7. An article of manufacture having a wrinkle finish surface obtained in accordance with the process described in claim 3.

8. An article of manufacture having a wrinkle finish surface obtained in accordance with the process described in claim 5.

EARL W. BALIS.
LESTER B. BRONK.

REFERENCES CITED

The following references are of record in the file of this patent:

UNITED STATES PATENTS

| Number | Name | Date |
| --- | --- | --- |
| 2,275,239 | Waldie | Mar. 3, 1942 |
| 2,306,222 | Patnode | Dec. 22, 1942 |
| 2,326,623 | Crosby | Aug. 10, 1943 |
| 2,439,689 | Hyde | Apr. 13, 1948 |